(12) United States Patent
Luo et al.

(10) Patent No.: US 11,292,360 B2
(45) Date of Patent: Apr. 5, 2022

(54) BATTERY EQUALIZATION METHOD AND SYSTEM, VEHICLE, STORAGE MEDIUM, AND ELECTRONIC DEVICE

(71) Applicant: BYD COMPANY LIMITED, Guangdong (CN)

(72) Inventors: Hongbin Luo, Shenzhen (CN); Chao Wang, Shenzhen (CN); Xiaofeng Shen, Shenzhen (CN); Qiuyong Zeng, Shenzhen (CN); Yuanhong Liu, Shenzhen (CN); Xiang Zhang, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 155 days.

(21) Appl. No.: 16/642,811

(22) PCT Filed: Aug. 31, 2018

(86) PCT No.: PCT/CN2018/103468
§ 371 (c)(1),
(2) Date: Feb. 27, 2020

(87) PCT Pub. No.: WO2019/042398
PCT Pub. Date: Mar. 7, 2019

(65) Prior Publication Data
US 2020/0346558 A1 Nov. 5, 2020

(30) Foreign Application Priority Data
Aug. 31, 2017 (CN) .......................... 201710775005.5

(51) Int. Cl.
*H02J 7/00* (2006.01)
*B60L 58/22* (2019.01)
*B60L 58/12* (2019.01)

(52) U.S. Cl.
CPC ............... *B60L 58/22* (2019.02); *B60L 58/12* (2019.02); *H02J 7/0019* (2013.01); *H02J 7/0048* (2020.01); *B60L 2240/547* (2013.01)

(58) Field of Classification Search
USPC .......................................... 320/118
See application file for complete search history.

(56) References Cited

U.S. PATENT DOCUMENTS

2010/0194339 A1* 8/2010 Yang ................... H02J 7/0016
320/116
2010/0201317 A1 8/2010 Shiu et al.
(Continued)

FOREIGN PATENT DOCUMENTS

CN 102496979 A 6/2012
CN 102957173 A 3/2013
(Continued)

OTHER PUBLICATIONS

Search Report for International Application No. PCT/CN2018/103468 dated Nov. 28, 2018.

*Primary Examiner* — Samuel Berhanu
(74) *Attorney, Agent, or Firm* — Calfee Halter & Griswold LLP (57) ABSTRACT

A battery equalization method includes: obtaining a voltage value of a to-be-equalized cell in a battery pack; obtaining a reference voltage value required for equalization; determining a target equalization duration of the to-be-equalized cell according to a voltage value of the to-be-equalized cell, the reference voltage value, and a preset equalization duty cycle, where the equalization duty cycle is a ratio of an equalization period in a unit cycle to the unit cycle, and the unit cycle includes the equalization period and a sampling period; and controlling equalization of the to-be-equalized cell in the equalization period in the unit cycle according to the target equalization duration. According to this method, (Continued)

sampling is separated from equalization in a unit cycle, thereby ensuring accuracy of collected battery information, making the calculated equalization duration relatively accurate, and improving equalization effects of the battery pack.

18 Claims, 4 Drawing Sheets

(56) References Cited

U.S. PATENT DOCUMENTS

| | | | |
|---|---|---|---|
| 2011/0127962 A1 | 6/2011 | Murao et al. | |
| 2012/0161707 A1* | 6/2012 | Kim | H02J 7/0016 320/118 |
| 2012/0223582 A1 | 9/2012 | Andrea | |
| 2012/0286733 A1* | 11/2012 | Chang | H02J 7/0018 320/118 |
| 2017/0141586 A1 | 5/2017 | Pernyeszi | |
| 2018/0316196 A1 | 11/2018 | Xiang et al. | |

FOREIGN PATENT DOCUMENTS

| | | |
|---|---|---|
| CN | 103094956 A | 5/2013 |
| CN | 103166257 A | 6/2013 |
| CN | 103701171 A | 4/2014 |
| CN | 104079016 A | 10/2014 |
| CN | 104106175 A | 10/2014 |
| CN | 104377776 A | 2/2015 |
| CN | 105429236 A | 3/2016 |
| CN | 205945121 U | 2/2017 |
| CN | 106602668 A | 4/2017 |
| CN | 207241459 U | 4/2018 |
| KR | 20160125205 A | 10/2016 |
| TW | 201138260 A | 11/2011 |
| TW | 201714341 A | 4/2017 |
| WO | 2014090560 A2 | 6/2014 |
| WO | 2017084474 A1 | 5/2017 |

* cited by examiner

BATTERY EQUALIZATION METHOD AND SYSTEM, VEHICLE, STORAGE MEDIUM, AND ELECTRONIC DEVICE

CROSS-REFERENCE TO RELATED APPLICATIONS

The present application is based on International Application No. PCT/CN2018/103468, filed on Aug. 31, 2018, and claims priority to Chinese Patent Application No. 201710775005.5, filed on Aug. 31, 2017, which are incorporated herein by reference in their entireties.

FIELD

The present application relates to the control technology field, and in particular, to a battery equalization method and system, a vehicle, a storage medium, and an electronic device.

BACKGROUND

Large-capacity storage batteries that provide power for electric vehicles are often referred to as power batteries. A power battery for vehicles is generally a module of multiple cells connected in series. While a battery is in use, the difference between the cells gradually increases, resulting in poor consistency between the cells. Due to the short stave effect of the battery, the capacity of a battery pack cannot be brought into full play, thereby decreasing the overall capacity of the battery pack. On the other hand, after the difference between the cells gradually increases, some cells tend to be overcharged and some cells tend to be overdischarged, thereby affecting the battery life and damaging the battery, and even generating a large amount of heat and causing a burn or explosion.

Therefore, managing equalization of the power battery of an electric vehicle effectively is helpful to improve the consistency between the cells in the power battery pack, reduce the capacity loss of the battery, and extend the battery life and the mileage of the electric vehicle, and is of great significance.

Currently, in equalization management on the battery pack, information on each cell in the battery pack is generally collected in real time. Then based on collected battery information, it is determined whether any cell needs to be equalized and, when a cell needs to be equalized, a duration of equalizing the cell is further determined based on the battery information. However, in this way, equalization may be in process while the battery information is being collected. In the equalization process, the battery information may fluctuate, leading to inaccuracy of collected battery information. Consequently, when a cell needs to be equalized, the calculated equalization duration is inaccurate, and the equalization effect is poor.

SUMMARY

The objective of the present application is to provide a battery equalization method and system, a vehicle, a storage medium, and an electronic device. According to this method, sampling is separated from equalization in a unit cycle, thereby ensuring accuracy of collected battery information, making the calculated equalization duration relatively accurate, and improving equalization effects of the battery pack.

To achieve the above objective, according to a first aspect, the present application provides a battery equalization method, including:

obtaining a voltage value of a to-be-equalized cell in a battery pack;

obtaining a reference voltage value required for equalization;

determining a target equalization duration of the to-be-equalized cell according to a voltage value of the to-be-equalized cell, the reference voltage value, and a preset equalization duty cycle, where the equalization duty cycle is a ratio of an equalization period in a unit cycle to the unit cycle, and the unit cycle includes the equalization period and a sampling period; and controlling equalization of the to-be-equalized cell in the equalization period in the unit cycle according to the target equalization duration.

According to a second aspect, the present application provides a battery equalization system. The system includes: an equalization module, a collection module, and a control module.

The collection module is configured to collect battery information of a battery pack, where the battery information is used to determine a voltage value of each cell in the battery pack.

The control module is configured to obtain a voltage value of a to-be-equalized cell in the battery pack; obtain a reference voltage value required for equalization; determine a target equalization duration of the to-be-equalized cell according to a voltage value of the to-be-equalized cell, the reference voltage value, and a preset equalization duty cycle, where the equalization duty cycle is a ratio of an equalization period to a unit cycle; and control equalization of the to-be-equalized cell in the equalization period in the unit cycle according to the target equalization duration.

The equalization module is configured to equalize the to-be-equalized cell under the control of the control module.

According to a third aspect, the present application provides a vehicle, including the battery equalization system according to the second aspect.

According to a fourth aspect, the present application provides a computer-readable storage medium, on which a computer program instruction is stored. When executed by a processor, the program instruction implements the method according to the first aspect.

According to a fifth aspect, the present application provides an electronic device, including:

the computer-readable storage medium according to the fourth aspect; and one or more processors, configured to execute a program in the computer-readable storage medium.

Through the above technical solution, the collection and the equalization of battery information are performed in separate periods in the unit cycle to avoid impact caused by an equalization current on precision of the battery information collection when the collection and the equalization of the battery information are performed simultaneously. On the other hand, the equalization duty cycle can reflect a ratio of the equalization period to the sampling period in a unit duration. Therefore, the target equalization duration calculated by taking account of the equalization duty cycle can better equalize the cell that needs to be equalized. In addition, a new method for determining a target equalization duration is provided.

Other features and advantages of the present application will be described in detail in the following detailed description.

BRIEF DESCRIPTION OF THE DRAWINGS

The accompanying drawings are used to provide a further understanding of the present application, constitute a part of the specification, are used to explain the present application together with the following specific implementations, but do not constitute a limitation on the present application. In the accompanying drawings.

DETAILED DESCRIPTION

The specific implementations of the present application will be described in detail below with reference to the accompanying drawings. It should be understood that, the specific implementations described herein are only used to illustrate and explain the present application, and are not intended to limit the present application.

Figure 1:
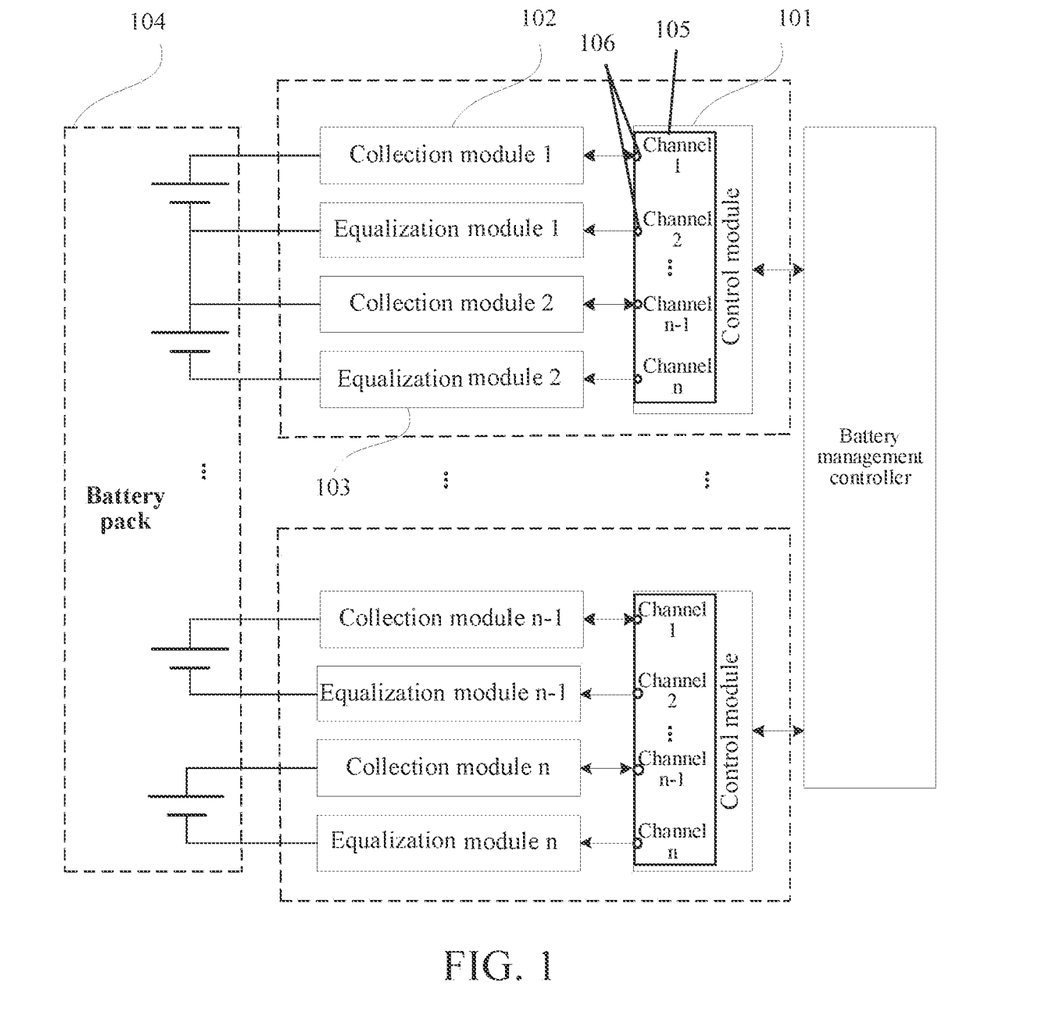
FIG. 1 is a schematic diagram of a battery equalization system according to an embodiment of the present application.

Referring to FIG. 1 which is a schematic diagram of a battery equalization system according to an embodiment of the present application, The battery equalization system includes a control module 101, a collection module 102, and an equalization module 103. The battery equalization system can be used to equalize the battery pack 104.

In an embodiment, each cell corresponds to a collection module 102 and an equalization module 104. The collection module 102 and the equalization module 103 that correspond to the same cell are connected to the control module 101 through different control cannels respectively. The control module 101 may include a control chip 105. The control chip 105 is respectively connected through two pins 106 to the collection module and the equalization module that correspond to the same cell, and the two pins 106 are in one-to-one correspondence to the two channels.

In this embodiment, the control module 101 controls the collection module 102 and the equalization module 103 get connected in separate periods in a unit cycle, and performs battery information collection and battery equalization separately, so that the battery information collection and the equalization are performed in separate periods. This avoids the impact caused by an equalization current on precision of the battery information collection when the collection and the equalization of the battery information are performed simultaneously.

In one embodiment, referring to FIG. 1, each cell in the battery is connected to a collection module 102 and an equalization module 103. If the battery pack includes N cells, the quantity of collection modules 102 is N, and the quantity of equalization modules 103 is N, the control module 101 is connected to the N collection modules and the N equalization modules through 2×N control channels respectively.

In other embodiments, different cells may share an equalization module. For example, N cells in a battery pack may share the same equalization module, or every preset number of (for example, 2, 3 or 5) cells share one equalization module, or the like. When at least two of multiple cells that share one equalization module need to be equalized, during the equalization period in a unit cycle, the equalization module is alternately connected to each of the at least two cells that need to be equalized.

Figure 2:
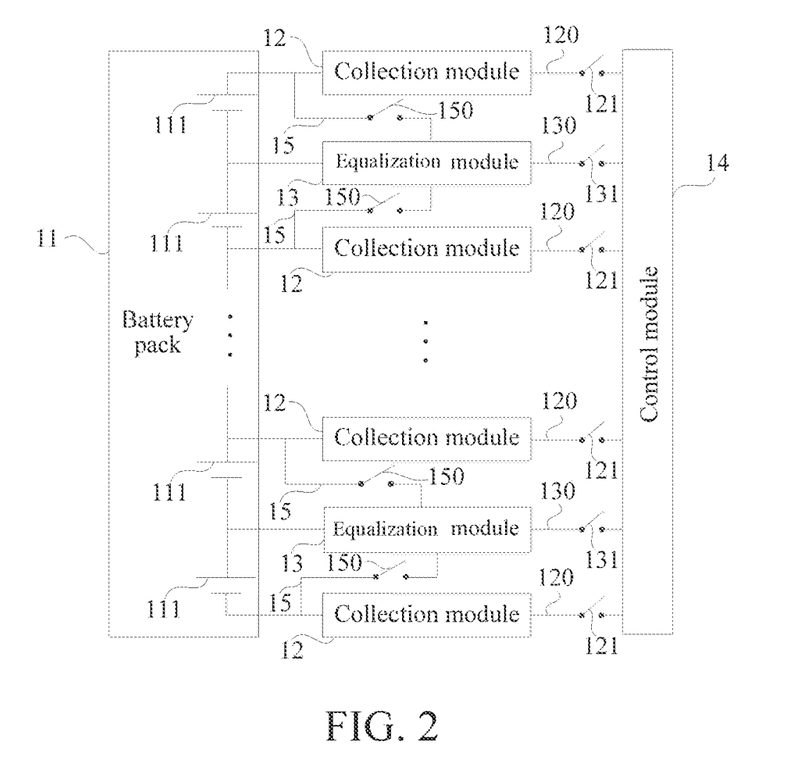
FIG. 2 is a schematic diagram of a battery equalization system in which two cells share one equalization module according to an embodiment of the present application.

Referring to FIG. 2, two cells share one equalization module. When both of the two cells that share one equalization module need to be equalized, the equalization module is alternately connected to each cell in the equalization period in a unit cycle. The alternate connection may be alternately connecting at specific intervals. For example, referring to FIG. 2, when a parallel switch 150 on a parallel branch circuit 15 corresponding to one cell 111 of the two cells is closed for 2 s under the control of the control module 14, a parallel switch 150 on a parallel branch circuit 15 corresponding to the other cell 111 of the two cells is open for 2 s under the control of the control module 14. That is, the parallel switch 150 on the parallel branch circuit 15 corresponding to each cell 111 of the two cells changes from the closed state to the open state or from the open state to the closed state every two seconds during the equalization period. Therefore, on the basis that the connection of the collection module is temporally separated from the connection of the equalization module, the cells that share the same equalization module are alternately connected to the shared equalization module during the equalization period to achieve equalization.

Figure 3:
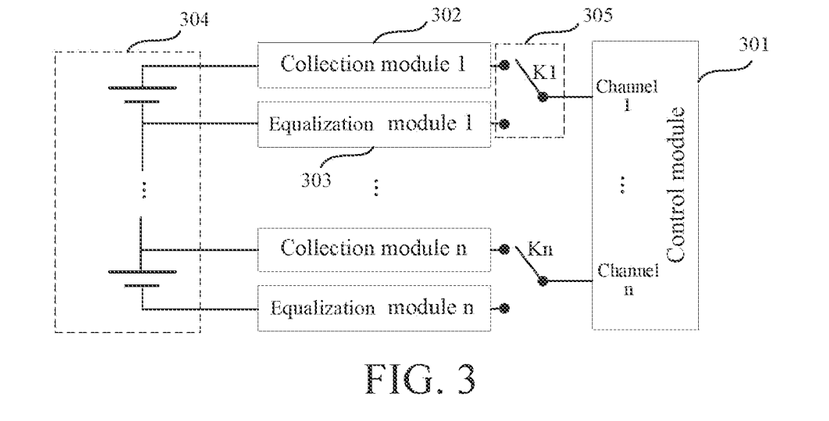
FIG. 3 is a schematic diagram of a battery equalization system according to another embodiment of the present application.

Refer to FIG. 3, which is a schematic structural diagram of a battery equalization system according to another embodiment of the present application.

The battery equalization system includes a control module 301, a collection module 302, and an equalization module 303. The battery equalization system can be used to equalize the battery pack 304. The battery pack 304 includes multiple cells connected in series. The control module 301 is connected through one control channel 305 to the collection module 302 and the equalization module 303 that correspond to the same cell. The control module 301 is configured to: when it is determined that the cell connected to the control module 301 does not need to be equalized, control the control module 301 to get connected to a corresponding sampling module 302. Alternatively, the control module 301 is further configured to: when it is determined that the cell connected to the control module 301 needs to be equalized, control the collection module 302 and the equalization module 303 to multiplex the control channel 305 in a time division manner in a unit cycle.

A unit cycle includes a collection period and an equalization period. The control module 301 controls the collection module 302 to sample battery information of the cell during a collection period to obtain the battery information of the cell. The battery information includes at least one of: voltage, current, temperature, and the like. In an embodiment, the battery information may include only a voltage value, thereby obtaining a voltage performance parameter of a cell. In another embodiment, the battery information may include a voltage value, a current value, a temperature value, and the like, thereby obtaining performance parameters such as state of charge (SOC), internal resistance, and self-discharge rate of the cell.

The control module 301 determines, according to the battery information of the cell collected by the collection module 302, a to-be-equalized cell that needs to be equalized. For the to-be-equalized cell that needs enabling of equalization, the control module 301 controls the equalization module corresponding to the to-be-equalized cell so that the equalization module equalizes the to-be-equalized cell in the equalization period.

Therefore, in the embodiment of the present application, the same control channel is shared between the collection module and the equalization module. The control module controls the collection module and the equalization module to multiplex the control channel in a time division manner in a unit cycle, thereby avoiding the impact caused by the equalization current to precision of battery information collection when the battery information collection and the equalization are performed simultaneously. On the other hand, compared with the embodiment shown in FIG. 1 above, the number of required channels of the control module chip is reduced, and some hardware costs are saved.

In one embodiment, a switch K is disposed in a control channel shared by the collection module and the equalization module. The control module 301 is connected to the switch K, and by controlling the switch K, implements connection to the collection module 302 or the equalization module 303 in separate periods. When the switch K is connected to the collection module 302, the control module 301 controls the collection module 302 to collect battery information of the cell in the collection period. When the switch K is connected to the equalization module 303, the control module 301 controls the equalization module 303 to equalize the corresponding cell.

In one embodiment, referring to FIG. 3, each cell in the battery is connected to a collection module 302 and an equalization module 303. If the battery pack includes N cells, the quantity of collection modules 302 is N, and the quantity of equalization modules 303 is N, the control module 301 is connected to the collection module and the equalization module through N control channels respectively.

In other embodiments, different cells may share an equalization module. For example, N cells in a battery pack may share the same equalization module, or every preset number of (for example, 2, 3 or 5) cells share one equalization module, or the like. When at least two of multiple cells that share one equalization module need to be equalized, during the equalization period in a unit cycle, the equalization module is alternately connected to each of the at least two cells that need to be equalized.

Figure 4:
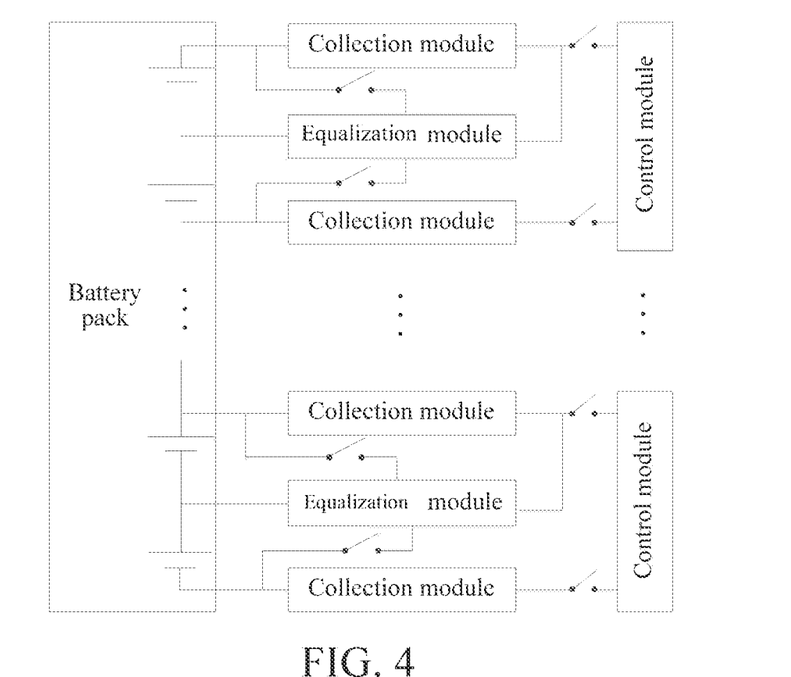
FIG. 4 is a schematic diagram of a battery equalization system in which two cells share one equalization module according to another embodiment of the present application.

Refer to FIG. 4, which is an exemplary schematic diagram in which two cells share one equalization module. When both of the two cells that share one equalization module need to be equalized, the equalization module is alternately connected to each cell in the equalization period in a unit cycle. The alternate connection may be alternately connecting at specific intervals. Therefore, on the basis that the connection of the collection module is temporally separated from the connection of the equalization module, the cells that share the same equalization module are alternately connected to the shared equalization module during the equalization period to achieve equalization.

In an embodiment, the collection module may be a voltage collection chip, configured to collect the voltage of the cell in the collection period.

Figure 5:
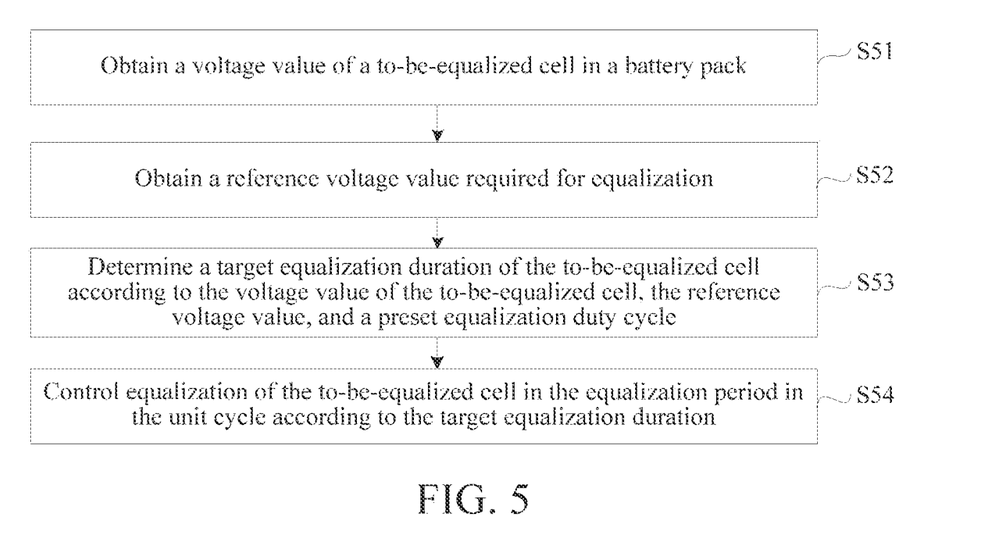
FIG. 5 is a schematic flowchart of a battery equalization method according to an embodiment of the present application.

Referring to FIG. 5, based on the battery equalization system in any one of the embodiments shown in FIG. 1, FIG. 2, FIG. 3, or FIG. 4, the battery equalization method according to an embodiment of the present application includes:

Step S51: Obtain a voltage value of a to-be-equalized cell in a battery pack;

Step S52: Obtain a reference voltage value required for equalization;

Step S53: Determine a target equalization duration of the to-be-equalized cell according to a voltage value of the to-be-equalized cell, the reference voltage value, and a preset equalization duty cycle, where the equalization duty cycle is a ratio of an equalization period in a unit cycle to the unit cycle, and the unit cycle includes the equalization period and a sampling period; and Step S54: Control equalization of the to-be-equalized cell in the equalization period in the unit cycle according to the target equalization duration.

The voltage value may be a load voltage value. In this case, the sampling module may directly obtain the load voltage value by collecting a voltage value of the to-be-equalized cell in the battery pack in the sampling period in a unit cycle. The voltage value may also be an open circuit voltage value. In this case, the open circuit voltage value can be calculated by the control module according to the load voltage value collected by the sampling module in the sampling period in the unit cycle. That is, open circuit voltage value=load voltage value+internal resistance value of a cell×charging current value or discharging current value of the cell. Alternatively, in another embodiment, the voltage collected when the cell stops operating and reaches a stable state or at the moment of the battery just starting operating is inherently an open circuit voltage or can be approximately regarded as an open circuit voltage. In this case, the open circuit voltage value of the cell can be collected directly.

Optionally, the to-be-equalized cell may be a to-be-equalized cell determined according to some performance parameters of the cell in the battery pack. The parameters used to determine the to-be-equalized cell may include voltage value, SOC, internal resistance, self-discharge rate, voltage change rate, SOC change rate, time change rate, and the like. Therefore, the methods for determining the to-be-equalized cell in the battery pack is diversified in the present application. In addition, the performance parameters used to determine the to-be-equalized cell may be obtained directly by collection in the sampling period in the unit cycle, or may be calculated according to the battery information collected in the sampling period in a unit cycle. Therefore, the performance parameters used to determine the to-be-equalized cell are relatively accurate, and the determined to-be-equalized cell is also relatively accurate.

Referring to Table 1 below, Table 1 exemplifies a method for determining a to-be-equalized cell in the battery pack when the parameters used to determine the to-be-equalized cell are voltage value, SOC, internal resistance, self-discharge rate, voltage change rate, SOC change rate, or time change rate, and a method for subsequently equalizing the corresponding to-be-equalized cell after the to-be-equalized cell is determined.

The self-discharge rate of the cell is used to represent capacity loss status and a capacity loss rate of the cell. In an embodiment, when the battery pack stops operating and reaches a stable state (at a time point t1), an open circuit voltage value V1 of each cell of the power battery pack is detected and recorded. At the moment of the battery pack resuming operation (at a time point t2), an open circuit voltage value V2 of each cell of the power battery pack is detected and recorded. The self-discharge rate η of each cell is calculated according to the open circuit voltage values of each cell that are obtained in the two detections. The method for calculating the self-discharge rate value η is as follows:

(1) Based on the open circuit voltage (OCV)-SOC curve of the battery (such as the curve shown in FIG. 6), find the SOC value corresponding to V1 and the SOC value corresponding to V2 according to the detected V1 and V2;

(2) Calculate a SOC change value ΔSOC of the battery according to the two SOC values that respectively correspond to V1 and V2;

(3) According to ΔSOC and a full capacity C of the battery, calculate the battery capacity of current discharged through self discharge of the battery, ΔQ=ΔSOC*C; and (4) Calculate the value of the self-discharge rate η of the battery: η=ΔQ/(t1−t2).

The voltage change rate of the cell may be a size of voltage change occurring when a specified physical variable of the cell changes per unit. For example, an example described in the present application is the size of voltage change of the cell (dv/dq) occurring when a preset capacity of current is charged into or discharged from the cell, or the size of voltage change of the cell (dv/dt) occurring when the cell is charged or discharged for a preset duration.

The SOC change rate of the cell may be a size of SOC change occurring when a specified physical variable of the cell changes per unit. For example, an example described in the present application is an incremental capacity of current (dq/dv) for increasing the voltage of the cell by one unit voltage from an initial voltage value, or a decremental capacity of current (dq/dv) for decreasing the voltage of the cell by one unit voltage from an initial voltage value.

The time change rate of the cell may be a size of time change occurring when a specified physical variable of the cell changes per unit. For example, an example described in the present application is a charging time (dq/dv) required for increasing the voltage of the cell by one unit voltage from an initial voltage value, or a discharge time (dq/dv) required for decreasing the voltage of the cell by one unit voltage from an initial voltage value.

TABLE 1

| Performance parameter | Method for determining equalization | Reference value of performance parameter | Usage of battery pack | Equalization method |
|---|---|---|---|---|
| Voltage | Determine that a cell which, in at least one cell, has a difference between its voltage value and a reference voltage value being greater than or equal to an equalization enabling threshold is a to-be-equalized cell | Smallest voltage value in the battery pack | Charge or discharge | Discharge the to-be-equalized cell, and perform passive equalization |
|  |  | Greatest voltage value in the battery pack | Charge or discharge | Charge the to-be-equalized cell, and perform active equalization |
|  |  | Average voltage value in the battery pack | Charge or discharge | Discharge the to-be-equalized cell whose voltage value is greater than the average value in the to-be-equalized cells, and perform passive equalization; and charge the to-be-equalized cell whose voltage value is less than the average value, and perform active equalization |
| SOC | Determine that a cell which, in at least one cell, has a difference between its SOC value and a reference SOC value being greater than or equal to an equalization enabling threshold is a to-be-equalized cell | Smallest SOC value in the battery pack | Charge or discharge | Discharge the to-be-equalized cell, and perform passive equalization |
|  |  | Greatest SOC value in the battery pack | Charge or discharge | Charge the to-be-equalized cell, and perform active equalization |
|  |  | Average SOC value in the battery pack | Charge or discharge | Discharge the to-be-equalized cell whose SOC value is greater than the average value in the to-be-equalized cells, and perform passive equalization; and charge the to-be-equalized cell whose SOC value is less than the average value, and perform active equalization |
| Self-discharge rate | Determine that a cell which, in at least one cell, has a difference between its self-discharge rate value and a reference self-discharge rate value being greater than or equal to an equalization enabling threshold is a | Smallest self-discharge rate value in the battery pack | Charge or discharge | Discharge the to-be-equalized cell, and perform passive equalization |
|  |  | Greatest self-discharge rate value in the battery pack | Charge or discharge | Charge the to-be-equalized cell, and perform active equalization |
|  |  | Average self-discharge rate value in the battery pack | Charge or discharge | Discharge the to-be-equalized cell whose self-discharge rate value is greater than the average value in the to-be-equalized cells, and perform passive |

TABLE 1-continued

| Performance parameter | Method for determining equalization | Reference value of performance parameter | Usage of battery pack | Equalization method |
|---|---|---|---|---|
| | to-be-equalized cell | | | equalization; and charge the to-be-equalized cell whose self-discharge rate value is less than the average value, and perform active equalization |
| Internal resistance | Determine that a cell which, in at least one cell, has a difference between its internal resistance value and a reference internal resistance value being greater than or equal to an equalization enabling threshold is a to-be-equalized cell | Smallest internal resistance value in the battery pack | Charge | Discharge the to-be-equalized cell, and perform passive equalization |
| | | | Discharge | Charge the to-be-equalized cell, and perform active equalization |
| | | Greatest internal resistance value in the battery pack | Charge | Charge the to-be-equalized cell, and perform active equalization |
| | | | Discharge | Discharge the to-be-equalized cell, and perform passive equalization |
| | | Average internal resistance value in the battery pack | Charge | Discharge the to-be-equalized cell whose internal resistance value is greater than the average value in the to-be-equalized cells, and perform passive equalization; and charge the to-be-equalized cell whose internal resistance value is less than the average value, and perform active equalization |
| | | | Discharge | Discharge the to-be-equalized cell whose internal resistance value is less than the average value in the to-be-equalized cells, and perform passive equalization; and charge the to-be-equalized cell whose internal resistance value is greater than the average value, and perform active equalization |
| Voltage change rate | Determine that a cell which, in at least one cell, has a difference between its voltage change rate value and a reference voltage change rate value being greater than or equal to an equalization enabling threshold is a to-be-equalized cell | Smallest voltage change rate value in the battery pack | Charge | Discharge the to-be-equalized cell, and perform passive equalization |
| | | | Discharge | Charge the to-be-equalized cell, and perform active equalization |
| | | Greatest voltage change rate value in the battery pack | Charge | Charge the to-be-equalized cell, and perform active equalization |
| | | | Discharge | Discharge the to-be-equalized cell, and perform passive equalization |
| | | Average voltage change rate value in the battery pack | Charge | Discharge the to-be-equalized cell whose voltage change rate value is greater than the average value in the to-be-equalized cells, and perform passive equalization; and charge the to-be-equalized cell whose voltage change rate value is less than the average value, and perform active equalization |
| | | | Discharge | Discharge the to-be-equalized cell whose voltage change rate value is less than the average value in the to-be-equalized cells, and perform passive equalization; and charge the to-be-equalized cell whose voltage change rate value is greater than the average value, and perform active equalization |

TABLE 1-continued

| Performance parameter | Method for determining equalization | Reference value of performance parameter | Usage of battery pack | Equalization method |
|---|---|---|---|---|
| SOC change rate | Determine that a cell which, in at least one cell, has a difference between its SOC change rate value and a reference SOC change rate value being greater than or equal to an equalization enabling threshold is a to-be-equalized cell | Smallest SOC change rate value in the battery pack | Charge | Discharge the to-be-equalized cell, and perform passive equalization |
| | | | Discharge | Charge the to-be-equalized cell, and perform active equalization |
| | | Greatest SOC change rate value in the battery pack | Charge | Charge the to-be-equalized cell, and perform active equalization |
| | | | Discharge | Discharge the to-be-equalized cell, and perform passive equalization |
| | | Average SOC change rate value in the battery pack | Charge | Discharge the to-be-equalized cell whose SOC change rate value is greater than the average value in the to-be-equalized cells, and perform passive equalization; and charge the to-be-equalized cell whose SOC change rate value is less than the average value, and perform active equalization |
| | | | Discharge | Discharge the to-be-equalized cell whose SOC change rate value is less than the average value in the to-be-equalized cells, and perform passive equalization; and charge the to-be-equalized cell whose SOC change rate value is greater than the average value, and perform active equalization |
| Time change rate | Determine that a cell which, in at least one cell, has a difference between its time change rate value and a reference time change rate value being greater than or equal to an equalization enabling threshold is a to-be-equalized cell | Smallest time change rate value in the battery pack | Charge | Discharge the to-be-equalized cell, and perform passive equalization |
| | | | Discharge | Charge the to-be-equalized cell, and perform active equalization |
| | | Greatest time change rate value in the battery pack | Charge | Charge the to-be-equalized cell, and perform active equalization |
| | | | Discharge | Discharge the to-be-equalized cell, and perform passive equalization |
| | | Average time change rate value in the battery pack | Charge | Discharge the to-be-equalized cell whose time change rate value is greater than the average value in the to-be-equalized cells, and perform passive equalization; and charge the to-be-equalized cell whose time change rate value is less than the average value, and perform active equalization |
| | | | Discharge | Discharge the to-be-equalized cell whose time change rate value is less than the average value in the to-be-equalized cells, and perform passive equalization; and charge the to-be-equalized cell whose time change rate value is greater than the average value, and perform active equalization |

In the embodiment of the present application, the reference voltage value used to calculate the target equalization duration of the to-be-equalized cell may be a minimum value of the voltage values of all cells, or a maximum value of the voltage values of all cells, or an average value of the voltage values of all cells.

The equalization duty cycle is a ratio of the equalization period in a unit cycle to the unit cycle, and may be used to represent the proportion of the equalization period and the sampling period to the unit cycle. The preset equalization duty cycle may be a preset equalization duty cycle that remains unchanged during the equalization process, for example, may be preset to 50%, or the like.

Optionally, after the voltage value of the to-be-equalized cell is determined, the target equalization duration of equalizing the to-be-equalized cell under the preset equalization duty cycle may be calculated. The following describes possible methods for determining the target equalization duration of the to-be-equalized cell according to the voltage value of the to-be-equalized cell and the reference voltage value.

Figure 6:
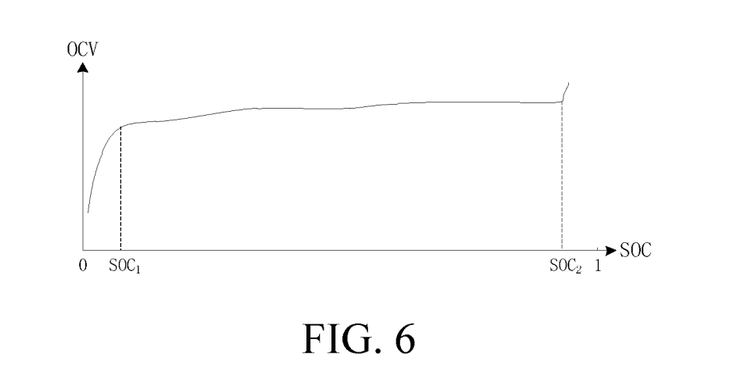
FIG. 6 shows an open circuit voltage (OCV)—state of charge (SOC) curve of a cell according to an embodiment of the present application.

The first method:

First, refer to FIG. 6, which shows an open circuit voltage (OCV)—state of charge (SOC) curve of a cell according to an embodiment of the present application.

The cell that, in all the cells, has the smallest difference (possibly 0) between its voltage value and the reference voltage value may be determined as a reference cell. According to a voltage value of the reference cell and an internal resistance value of the reference cell, a reference OCV value of the reference cell is determined. Then, according to the reference OCV value and an OCV-SOC curve of the reference cell, a SOC value corresponding to the reference OCV value is determined as a first SOC value.

The OCV value of the to-be-equalized cell is determined according to the voltage value of the to-be-equalized cell and the internal resistance value of the to-be-equalized cell. Then, according to the OCV-SOC curve of the to-be-equalized cell, it is determined that the SOC value corresponding to the OCV value of the to-be-equalized cell is a second SOC value.

Figure 7:
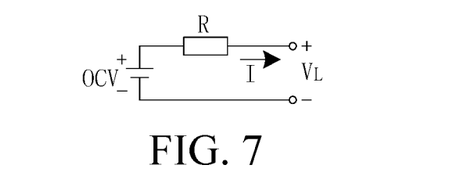
FIG. 7 is a schematic diagram of a battery internal resistance model according to an embodiment of the present application.

Hereinafter, a process of obtaining the SOC value according to the voltage value and the internal resistance value will be described with reference to FIG. 7 and formula (1):

Referring to FIG. 7 and formula (1), when the battery pack is in a discharging state or a charging state, a cell equivalently serving as an ideal voltage source is connected to a resistor R in series according to a battery internal resistance model. Therefore, for a cell, the voltage value $V_L$ (that is, the load voltage value) of the cell that is obtained by sampling may be converted into an open circuit voltage value according to formula (1):

$$OCV = V_L + I \times R \quad (1)$$

where $V_L$ is the load voltage value collected by the collection module in the collection period; I is a discharging current or charging current (which may be a preset value) collected by the collection module in the collection period; and R is the internal resistance value of the cell.

The internal resistance value of the cell may be preset. Alternatively, the internal resistance value of the cell may be determined according to the voltage and capacity of the cell. For example, the internal resistance value of the cell is determined according to a correspondence between the voltage, the capacity, and the internal resistance value of the cell. It should be understood that another battery model such as a Thevenin model, or a Partnership for a New Generation of Vehicles (PNGV) model may be applied to convert the collected load voltage of the cell into an open circuit voltage.

After obtaining the open circuit voltage of the cell, the SOC value corresponding to the cell can be obtained according to the OCV-SOC curve of the cell.

It should be understood that the OCV-SOC curve shown in FIG. 6 may also be converted into an OCV-SOC correspondence table. One OCV value corresponds to one SOC value, or one OCV range corresponds to one SOC value.

In an embodiment of the present application, the OCV-SOC curve or the OCV-SOC correspondence table may be obtained through measurement. For example, for a cell, in the process of changing its SOC value from 0 to 100%, the open circuit voltage (OCV) of the battery is measured at intervals equivalent to a specific SOC value, and then the OCV corresponding to each point is in one-to-one correspondence to the SOC, thereby forming a SOC-OCV curve or an OCV-SOC correspondence table of the cell.

It should be understood that in measuring the open circuit voltage (OCV), the load voltage of the cell may be collected first, and then the load voltage is converted into the corresponding open circuit voltage (OCV) according to formula (1).

Therefore, the first SOC value of the reference cell can be obtained according to the reference voltage value, the internal resistance value of the reference cell, and the OCV-SOC curve corresponding to the reference cell. The second SOC value of the to-be-equalized cell is obtained according to the voltage value of the to-be-equalized cell, the internal resistance of the to-be-equalized cell, and the OCV-SOC curve corresponding to the to-be-equalized cell.

Subsequently, a SOC difference is determined according to formula (2):

$$\Delta Q = \Delta SOC \times C_n \quad (2)$$

where $\Delta Q$ is the SOC difference, $\Delta SOC$ is a SOC difference between the first SOC value and the second SOC value, and $C_n$ is an available capacity of the to-be-equalized cell.

The target equalization duration of the to-be-equalized cell is determined according to formula (3):

$$t = \Delta Q / (I \times \tau) \quad (3)$$

where t is the preset equalization duration of the to-be-equalized cell, I is the preset equalization current of the to-be-equalized cell, and $\tau$ is the equalization duty cycle. The equalization duty cycle is a ratio of the equalization period in a unit cycle to the unit cycle. In the embodiment of the present application, the equalization duty cycle may be a value preset according to the requirements, for example, may be preset to 50%, or the like.

After the target equalization duration of the to-be-equalized cell is determined, the to-be-equalized cell is equalized according to the target equalization duration, so as to improve equalization efficiency and reduce equalization costs.

The second determining method includes the following steps:

determining the target equalization duration of the to-be-equalized cell according to a voltage difference between the voltage value of the to-be-equalized cell and the reference voltage value, and a correspondence between a preset voltage difference, the equalization duty cycle, and a equalization duration.

The correspondence between the preset voltage difference, the equalization duty cycle, and the equalization duration may be obtained through multiple equalization experiments or obtained empirically. For example, a table may be used to keep a record, and then the value of the target equalization duration corresponding to the measured voltage difference and the preset equalization duty cycle may be searched out in the table.

After the target equalization duration is obtained, the to-be-equalized cell may be equalized in the equalization period in a unit cycle according to the target equalization duration. Depending on the reference voltage value used to calculate the equalization duration, the equalization method may vary.

Optionally, if the reference voltage value is a minimum value of the voltage values of all cells, the to-be-equalized cell is controlled to discharge in the equalization period in a unit cycle. Alternatively, if the reference voltage value is a maximum value of the voltage values of all cells, the to-be-equalized cell is controlled to charge in the equalization period in a unit cycle. Alternatively, if the reference voltage value is an average value of the voltage values of all cells, when the voltage value of the to-be-equalized cell is greater than the reference voltage value, the to-be-equalized cell is controlled to discharge in the equalization period in a unit cycle and, when the voltage value of the to-be-equalized cell is less than the reference voltage value, the to-be-equalized cell is controlled to charge in the equalization period in a unit cycle.

Equalization Process

Figure 8:
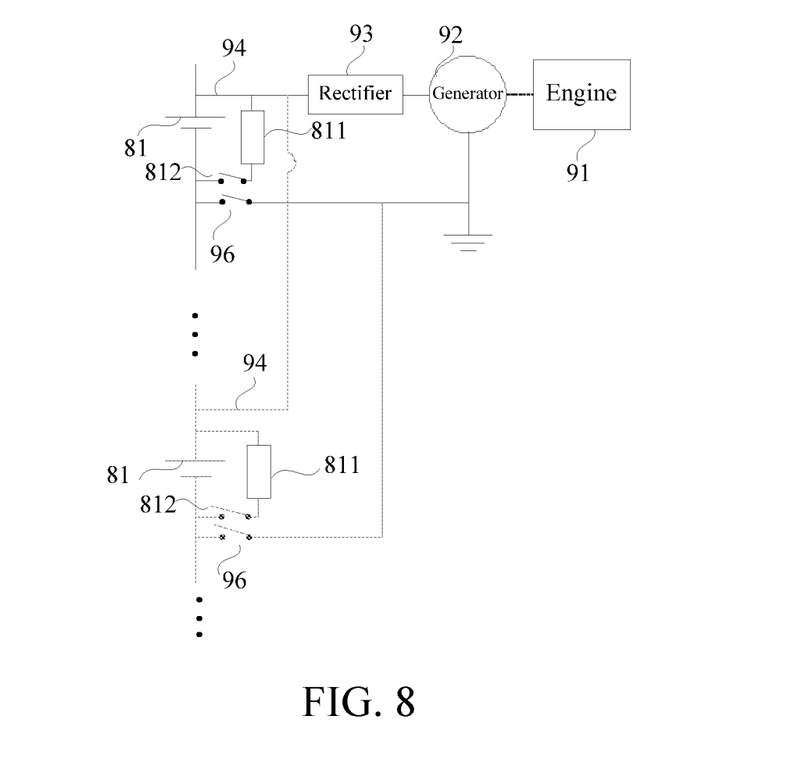
FIG. 8 is a schematic diagram of an equalization module according to an embodiment of the present application.

Refer to FIG. 8, which is a schematic diagram of an equalization module according to an embodiment of the present application. The controlling the equalization of the to-be-equalized cell in the equalization period in a unit cycle needs to be performed with reference to the equalization judgment described above. According to the step of equalization judgment, it is determined whether the equalization method of the to-be-equalized cell is passive equalization (that is, the to-be-equalized cell is discharged) or active equalization (that is, the to-be-equalized cell is charged), and the corresponding equalization module is connected.

Referring to FIG. 8, for the passive equalization, the equalization module includes: a resistor 811. Each cell corresponds to an equalization module. That is, a resistor is connected in parallel at both ends of each cell.

For a to-be-equalized cell that needs to be passively equalized, the control module controls a parallel circuit between the to-be-equalized cell and its corresponding resistor to get connected in the equalization period in a unit cycle, so as to perform passive equalization for the cell. Referring to FIG. 8, by controlling a switch module 812 to get connected, the control module implements connection of the parallel circuit between the to-be-equalized cell and its corresponding resistor.

The resistor 811 may be a fixed-value resistor or a variable resistor. In one embodiment, the resistor 811 may be a thermistor with a positive temperature coefficient, and may change with the change of the temperature. In this way, an equalization current generated in the equalization can be adjusted, and heat generated by the battery equalization system can be automatically adjusted, and finally, the temperature of the battery equalization system can be effectively controlled.

Referring to FIG. 8, for active equalization, the equalization module includes a charging branch circuit 94 connected in parallel with each cell 95 in the battery pack. The charging branch 94 is in one-to-one correspondence to the cell 95, and each charging branch circuit 94 is connected to a generator 92. The generator 92 is mechanically connected to an engine 91 through a gear.

For the to-be-equalized cell that needs to be actively equalized, the control module controls the charging branch circuit 94 corresponding to the to-be-equalized cell to get connected. When rotating, the engine 91 drives the generator 92 to generate electricity, so that electricity generated by the generator 92 is transmitted to the to-be-equalized cell, and the SOC of the to-be-equalized cell increases.

Referring to FIG. 8, when the generator 92 is an alternator, the equalization module further includes a rectifier 93 connected in series with the generator 92. Each charging branch circuit 130 is connected in series with the rectifier 132. After alternating current power generated by the generator 92 is converted into direct current power by the rectifier 93, the generator 92 can be used to charge the to-be-equalized cell.

Referring to FIG. 8, by controlling the switch 96 corresponding to the to-be-equalized cell to get connected, the control module causes the charging branch circuit corresponding to the to-be-equalized cell to get connected to perform active equalization on the to-be-equalized cell.

In some other embodiments, the to-be-equalized cell can not only be charged by a generator as shown in FIG. 8, but may also be charged by a start-up battery in the vehicle.

In another embodiment, not only the resistor and the to-be-equalized cell are connected in parallel as shown in FIG. 8, the to-be-equalized cell may also be connected in parallel to the start-up battery of the entire vehicle. In this way, the SOC discharged by the to-be-equalized cell is charged into the start-up battery, and power waste is effectively avoided while equalization of the to-be-equalized cell is achieved.

As described above, in the embodiment of the present application, multiple cells may share one equalization module. When at least two of multiple cells sharing one equalization module need to be equalized, the equalization module is alternately connected to each of the at least two to-be-equalized cells in the equalization period in a unit cycle to equalize each cell separately.

Correspondingly, in an embodiment of the present application, a vehicle is further provided, which includes the battery equalization system.

Correspondingly, in an embodiment of the present application, a computer-readable storage medium is further provided, on which a computer program instruction is stored. When executed by a processor, the program instruction implements the battery equalization method.

Correspondingly, in an embodiment of the present application, an electronic device is further provided, which includes: the computer-readable storage medium; and one or more processors for executing a program in the computer-readable storage medium.

The preferred implementations of the present application have been described in detail above with reference to the accompanying drawings, but the present application is not limited to the specific details in the above implementations. Various simple variations can be made to the technical solutions of the present application within the scope of the technical idea of the present application, and such simple variations shall fall within the protection scope of the present application.

In addition, it should be noted that, the specific technical features described in the foregoing specific implementations may be combined in any appropriate manner without conflict. To avoid unnecessary repetition, various possible combinations are not described in this application.

In addition, various implementations of the present application may be combined without violating the idea of the present application, and such combinations shall also be regarded as the content disclosed in the present application.

What is claimed is:

1. A battery equalization method, comprising:
determining a to-be-equalized cell in a battery pack by collecting performance parameters in a sampling period in a unit cycle;
obtaining a voltage value of the to-be-equalized cell;
obtaining a reference voltage value required for equalization;
determining a target equalization duration of the to-be-equalized cell according to a voltage value of the to-be-equalized cell, the reference voltage value, and a preset equalization duty cycle, wherein the equalization duty cycle is a ratio of an equalization period in a unit cycle to the unit cycle, wherein the unit cycle comprises the equalization period and the sampling period; and
controlling equalization of the to-be-equalized cell in the equalization period in the unit cycle according to the target equalization duration, and
wherein the determining the target equalization duration comprises:
determining, according to a voltage value of a reference cell and an open circuit voltage (OCV)—state of charge (SOC) curve (OCV-SOC curve) of the reference cell, a first SOC value corresponding to the voltage value of the reference cell, wherein the reference cell is a cell that, in the battery pack, has a smallest difference between the voltage value of the cell and the reference voltage value;
determining, according to the voltage value of the to-be-equalized cell and the OCV-SOC curve of the to-be-equalized cell, a second SOC value corresponding to the voltage value of the to-be-equalized cell; and
determining the target equalization duration according to the first SOC value, the second SOC value, and the equalization duty cycle.

2. The method according to claim 1, wherein the step of determining the first SOC value corresponding to the voltage value of the reference cell comprises:
determining a reference OCV value of the reference cell according to the voltage value of the reference cell and an internal resistance value of the reference cell; and
determining, according to the reference OCV value and the OCV-SOC curve of the reference cell, that the SOC value corresponding to the reference OCV value is the first SOC value; and
wherein the step of determining the second SOC value corresponding to the voltage value of the to-be-equalized cell comprises:
determining an OCV value of the to-be-equalized cell according to the voltage value of the to-be-equalized cell and an internal resistance value of the to-be-equalized cell; and
determining, according to the OCV-SOC curve of the to-be-equalized cell, that the SOC value corresponding to the OCV value of the to-be-equalized cell is the second SOC value.

3. The method according to claim 1, wherein the step of determining the target equalization duration according to the first SOC value, the second SOC value, and the equalization duty cycle comprises:
determining a SOC difference based on $\Delta Q = \Delta SOC \times C_n$, wherein $\Delta Q$ is the SOC difference, $\Delta SOC$ is a SOC difference value between the first SOC value and the second SOC value, and $C_n$ is an available capacity of the to-be-equalized cell; and
determining the target equalization duration based on $t=\Delta Q/(I \times \tau)$, wherein t is the target equalization duration, I is an equalization current of the to-be-equalized cell, and $\tau$ is the equalization duty cycle.

4. The method according to claim 1, wherein the step of determining a target equalization duration of the to-be-equalized cell according to the voltage value of the to-be-equalized cell, the reference voltage value, and a preset equalization duty cycle comprises:
determining the target equalization duration of the to-be-equalized cell according to a voltage difference between the voltage value of the to-be-equalized cell and the reference voltage value, and a corresponding relationship between a preset voltage difference, the equalization duty cycle, and an equalization duration.

5. The method according to claim 1, wherein the reference voltage value is a minimum value of voltage values of all cells, a maximum value of voltage values of all cells, or an average value of voltage values of all cells.

6. The method according to claim 5, wherein the step of controlling equalization of the to-be-equalized cell in the equalization period in the unit cycle comprises:
controlling discharge of the to-be-equalized cell in the equalization period in the unit cycle if the reference voltage value is the minimum value of the voltage values of all cells; or
controlling charging of the to-be-equalized cell in the equalization period in the unit cycle if the reference voltage value is the maximum value of the voltage values of all cells; or
controlling, if the reference voltage value is the average value of the voltage values of all cells, discharge of the to-be-equalized cell in the equalization period in the unit cycle when the voltage value of the to-be-equalized cell is greater than the reference voltage value, and controlling charging of the to-be-equalized cell in the equalization period in the unit cycle when the voltage value of the to-be-equalized cell is less than the reference voltage value.

7. The method according to claim 1, wherein the performance parameters comprise a SOC value, an internal resistance value, a self-discharge rate value, a voltage change rate, a SOC change rate, a time change rate, or at least one thereof.

8. A battery equalization system, comprising an equalization module, a collection module, and a control module, wherein:
the collection module is configured to collect battery information of a battery pack, wherein the battery information is used to determine a voltage value of each cell in the battery pack;
the control module is configured to:
obtain a voltage value of a to-be-equalized cell in the battery pack;
obtain a reference voltage value required for equalization;
determine a target equalization duration of the to-be-equalized cell according to a voltage value of the to-be-equalized cell, the reference voltage value, and a preset equalization duty cycle, wherein the equalization duty cycle is a ratio of an equalization period to a unit cycle;
determine, according to a voltage value of a reference cell and an open circuit voltage (OCV)—state of charge (SOC) curve (OCV-SOC curve) of the reference cell, a first SOC value corresponding to the voltage value of the reference cell, wherein the reference cell is a cell that, in the battery pack, has a smallest difference between the voltage value of the cell and the reference voltage value;

determine, according to the voltage value of the to-be-equalized cell and the OCV-SOC curve of the to-be-equalized cell, a second SOC value corresponding to the voltage value of the to-be-equalized cell; and determine the target equalization duration according to the first SOC value, the second SOC value, and the equalization duty cycle; and control equalization of the to-be-equalized cell in the equalization period in the unit cycle according to the target equalization duration;

the equalization module is configured to equalize the to-be-equalized cell under the control of the control module.

9. The battery equalization system according to claim 8, wherein the control module is configured to:

determine a reference OCV value of the reference cell according to the voltage value of the reference cell and an internal resistance value of the reference cell;

determine, according to the reference OCV value and the OCV-SOC curve of the reference cell, that the SOC value corresponding to the reference OCV value is the first SOC value;

determine an OCV value of the to-be-equalized cell according to the voltage value of the to-be-equalized cell and an internal resistance value of the to-be-equalized cell; and determine, according to the OCV-SOC curve of the to-be-equalized cell, that the SOC value corresponding to the OCV value of the to-be-equalized cell is the second SOC value.

10. The battery equalization system according to claim 8, wherein the control module is configured to:

determine a SOC difference based on $\Delta Q = \Delta SOC \times C_n$, wherein $\Delta Q$ is the SOC difference, $\Delta SOC$ is a SOC difference value between the first SOC value and the second SOC value, and $C_n$ is an available capacity of the to-be-equalized cell; and determine the target equalization duration based on $t = \Delta Q/(I \times \tau)$, wherein t is the target equalization duration, I is an equalization current of the to-be-equalized cell, and $\tau$ is the equalization duty cycle.

11. The battery equalization system according to claim 8, wherein the control module is configured to:

determine the target equalization duration of the to-be-equalized cell according to a voltage difference between the voltage value of the to-be-equalized cell and the reference voltage value, and a correspondence between a preset voltage difference, the equalization duty cycle, and an equalization duration.

12. The battery equalization system according to claim 8, wherein the control module is further configured to:

determine the to-be-equalized cell in the battery pack according to performance parameters of cells in the battery pack, wherein the performance parameters comprise a SOC value, an internal resistance value, a self-discharge rate value, a voltage change rate, a SOC change rate, a time change rate, or at least one thereof.

13. The battery equalization system according to claim 8, wherein the control module is connected through one channel to the collection module and the equalization module that correspond to a same cell, and the control module is configured to: when it is determined that the cell connected to the control module does not need to be equalized, control the control module to get connected to a corresponding sampling module; or the control module is further configured to: when it is determined that the cell connected to the control module needs to be equalized, control the collection module and the equalization module to multiplex the channel in a time division manner.

14. The battery equalization system according to claim 13, wherein the control module comprises a control chip, and the control chip is connected through one pin and the one channel to the collection module and the equalization module that correspond to the same cell.

15. The battery equalization system according to claim 8, wherein the control module is respectively connected through two channels to the collection module and the equalization module that correspond to the same cell.

16. The battery equalization system according to claim 15, wherein the control module comprises a control chip, the control chip is respectively connected through two pins to the collection module and the equalization module that correspond to the same cell, and the two pins are in one-to-one correspondence to the two channels.

17. A vehicle, wherein the vehicle comprises a battery pack and the battery equalization system according to claim 8.

18. A computer-readable storage medium on which a computer program instruction is stored, wherein the program instruction implements the method according to claim 1 when executed by a processor.

* * * * *